(12) United States Patent
Elia et al.

(10) Patent No.: US 8,003,202 B2
(45) Date of Patent: Aug. 23, 2011

(54) SEMIAROMATIC POLYAMIDE COMPOSITE ARTICLE AND PROCESSES FOR ITS PREPARATION

(75) Inventors: Andri E. Elia, Chadds Ford, PA (US); Andreas Renken, Geneva (CH); David V. Mesaros, Salida, CO (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 1110 days.

(21) Appl. No.: 11/811,043

(22) Filed: Jun. 8, 2007

(65) Prior Publication Data

US 2008/0008879 A1    Jan. 10, 2008

Related U.S. Application Data

(60) Provisional application No. 60/814,117, filed on Jun. 16, 2006.

(51) Int. Cl.
*B32B 7/02* (2006.01)
(52) U.S. Cl. .................... 428/297.4; 428/323; 428/326; 428/474.4; 428/480; 428/500
(58) Field of Classification Search ............ 428/323, 428/474.4, 480, 500, 297.4, 326
See application file for complete search history.

(56) References Cited

U.S. PATENT DOCUMENTS

| | | | |
|---|---|---|---|
| 3,264,272 A | 8/1966 | Rees | |
| 4,187,358 A | 2/1980 | Kyo | |
| 5,066,536 A * | 11/1991 | Cogswell et al. | 428/216 |
| 5,207,961 A | 5/1993 | Wank | |
| 5,219,642 A | 6/1993 | Meakin | |
| RE34,447 E | 11/1993 | Poppe | |
| 5,770,313 A | 6/1998 | Fuiumoto | |
| 6,644,722 B2 | 11/2003 | Cooper | |
| 2002/0012806 A1 * | 1/2002 | Flepp et al. | 428/474.9 |

FOREIGN PATENT DOCUMENTS

EP    1 387 760 B1    5/2002

* cited by examiner

*Primary Examiner* — Leszek Kiliman

(57) ABSTRACT

A semiaromatic polyamide composite article comprising a first component comprising a fiber-reinforced material comprising a polyamide composition and reinforcing fibers and having a tensile modulus of at least about 16 GPa as measured by ISO method 527-2:1993 at a rate of 5 mm/min on test specimens having a thickness of 4 mm, a second component comprising a polyamide composition, and an optional tie layer therebetween. The polyamide composition of first component and/or the second component is a semiaromatic polyamide compositions. The second component is prepared by injection molding and/or injection-compression molding the semiaromatic polyamide composition onto the first component.

10 Claims, No Drawings

SEMIAROMATIC POLYAMIDE COMPOSITE ARTICLE AND PROCESSES FOR ITS PREPARATION

CROSS REFERENCE TO RELATED APPLICATIONS

This application claims the benefit of U.S. Provisional Application No. 60/814,117, filed Jun. 16, 2006.

FIELD OF THE INVENTION

The present invention relates to a semiaromatic polyamide composite article comprising a component comprising a fiber-reinforced material comprising a polyamide composition, an overmolded component comprising a polyamide composition, and an optional tie layer therebetween, wherein at least one of the polyamide compositions is a semiaromatic polyamide composition.

BACKGROUND OF THE INVENTION

The design flexibility afforded by many thermoplastic compositions and their relatively light weights and corrosion resistances make them attractive materials for the replacement of metal components in many applications. However, thermoplastic compositions often possess an insufficient combination of stiffness, strength, toughness and/or other physical properties to satisfy the requirements of many of these applications. Semiaromatic polyamides, in particular, would be desirable materials to use in many metal-replacement applications as they can exhibit a roughly constant stiffness over a wide and useful temperature range for many applications, including automotive uses. The addition of fibrous reinforcing agents to semiaromatic polyamide compositions can produce materials having good stiffnesses, but this gain is often at the expense of the toughness of the resulting material. It would thus be desirable to produce semiaromatic polyamide structures having physical properties that rendered them suitable for use as replacements for metal components in various applications.

U.S. Pat. No. 6,644,722 discloses a molded article having a rigid support to which is attached a rigid hollow thermoplastic member. U.S. Pat. No. 5,219,642 discloses a structural thermoplastic composite material comprising a laminate of a fiber reinforced thermoformable crystalline polymer composite and an adherent layer of a second thermoformable polymer. U.S. Re 34,447 discloses crystalline polyamide compositions and laminates made therefrom. EP 1387760 discloses a method of production of a fiber-reinforced plastic component.

SUMMARY OF THE INVENTION

There is disclosed and claimed herein a semiaromatic polyamide composite article comprising:
(a) a first component having a surface and comprising a fiber-reinforced material comprising a polyamide composition and reinforcing fibers, wherein the first component is not prepared by injection molding and the fiber-reinforced material has a tensile modulus of at least about 16 GPa as measured by ISO method 527-2:1993 at a rate of 5 mm/min on test specimens having a thickness of 4 mm;
(b) an optional tie layer having first and second opposite surfaces such that when the tie layer is present, the first surface of the tie layer is in contact with the surface of the first component; and
(c) a second component comprising a polyamide composition, wherein the polyamide composition of the first component and/or the polyamide composition of the second component Is a semiaromatic polyamide composition; and wherein the article is prepared by a process comprising injection molding and/or injection-compression molding the composition onto the surface of the first component when the optional tie layer is not present and injection molding and/or injection-compression molding the composition of the second component onto the second surface of the optional tie layer when the tie layer is present.

DETAILED DESCRIPTION OF THE INVENTION

The articles of the present invention are composite structures comprising a first component that comprises a fiber reinforced material comprising a polyamide composition and reinforcing fibers, and a second component that comprises a polyamide composition. The structures are formed by injection molding and/or injection-compression molding the polyamide composition of the second component onto at least one surface of the first component. In one embodiment of the invention, the second component is in direct contact with the surface of the first component. In another embodiment of the invention, a tie layer comprising a different material may be present between the second component and all or part of the overmolded surface of the first component. In certain embodiments of the invention, the first component may be encapsulated wholly or partially by the second component.

The polyamide composition of first component, the second component, or both components is a semiaromatic polyamide composition. The polyamide compositions of the first and second components may the same or different. In one embodiment of the invention, the polyamide compositions of the first and second components are both semiaromatic polyamide compositions. The semiaromatic polyamide compositions may be the same or different.

The first component may be formed from the fiber-reinforced material by processes such as, but not limited to, one or more of die cutting, stamping, thermoforming, machining, compression molding, and the like. The first component is not prepared by injection molding.

The fiber reinforced material has a tensile modulus of at least about 16 GPa, or preferably of at least about 20 GPa, or more preferably of at least about 30 GPa, as determined by ISO method 527-2:1993 at a rate of 5 mm/min on test specimens having a thickness of 4 mm.

The fiber-reinforced material may be formed using any suitable method known to those skilled in the art. It may, for example, be in the form of a laminate comprising one or more layers of reinforcing fibers and at least one polyamide composition where the fiber layers have been impregnated by the polymer composition. The laminate may be formed by, for example, laminating polyamide composition sheets and fibers, by, for example, heat pressing. The fibers may be in any suitable form known to those skilled in the art, such as woven or nonwoven mats, unidirectional strands, and the like and different layers may be formed from different kinds of fibers and/or any given layer may be formed from two or more kinds of fibers. The fibers may be unidirectional, bi directional, or multidirectional. Preimpregated unidirectional fibers and fiber bundles may be formed into woven or nonwoven mats or other structures suitable for lamination or other methods of forming the fiber reinforced material. The fiber-reinforced material may be in the form of a unidirectional preimpregnated material or a multiaxial laminate of a preimpregnated material.

The fibers used in the fiber-reinforced material may be any suitable fiber and may be a mixture of two or more materials. Preferred fibers include glass fibers, carbon fibers, and aramid fibers.

In one embodiment of the present application, the composition of the second component is injection molded and/or injection-compression molded onto at least one surface of the first component. The first component may be fully or partially encapsulated by the second component. The first component may be inserted into a mold into which the composition of the second component is injected in molten form. Thus, the second component is in direct contact with the surface of the first component.

In another embodiment of the present invention, the composition of the second component is injection molded and/or injection-compression molded onto a surface of a tie layer having an opposite surface that is in contact with at least one surface of the first component. In the structure of the invention, the tie layer is adhered to the first and second components. The tie layer may serve to promote adhesion between the first and second components and may comprise one or more polymeric compositions other than the polyamides used in the first and second components. The tie layer may be in the form of one or more sheets placed on the surface of the first component over which the composition of the second component is injection molded and/or injection-compression molded. The tie layer may also be adhered to the surface of the first component. The tie layer may be added to the surface of the first component by any method known in the art, such as by laminating one or more sheets or films comprising the tie layer material to the surface. The tie layer may also be applied to the surface of the first component by dip coating or spraying.

The second component may also be injection molded and/or injection-compression molded onto a surface of the first component that does not contain a tie layer and onto a surface of a tie layer having an opposite surface that is in contact with at least one surface of the first component.

Examples of materials suitable for use in an optional tie layer include one or more aliphatic polyamides such as polyamide 6; polyamide 6,6; polyamide 6,10; polyamide 6,12; polyamide 12; polyamide 11; amorphous polyamides (such as hexamethylene terephthalamide/hexamethylene isophthalamide copolyamide (6T/6I); and the like. The tie layer may comprise one or more ionomers. By an ionomer is meant a carboxyl group containing polymer that has been neutralized or partially neutralized with bivalent metal cations such as zinc, manganese, magnesium, cadmium, tin(II), cobalt(II), antimony(II), sodium, or lithium and the like. Examples of ionomers are described in U.S. Pat. Nos. 3,264,272 and 4,187,358. Examples of suitable carboxyl group containing polymers include, but are not limited to, ethylene/acrylic acid copolymers and ethylene/methacrylic acid copolymers. The carboxyl group containing polymers may also be derived from one or more additional monomers, such as, but not limited to, butyl acrylate. Zinc salts are preferred neutralizing agents. Ionomers are commercially available under the Surlyn® trademark from E.I. du Pont de Nemours and Co., Wilmington, Del. The tie layer may comprise polyurethanes, including thermally activated polyurethanes, such as those described in U.S. Pat. No. 5,207,961, which is hereby incorporated by reference herein.

The polyamide compositions used in the first and second components comprise at least one suitable polyamide. Suitable polyamides can be condensation products of dicarboxylic acids or their derivatives and diamines, and/or aminocarboxylic acids, and/or ring-opening polymerization products of lactams. Suitable dicarboxylic acids include adipic acid, azelaic acid, sebacic acid, dodecanedioic acid, isophthalic acid, and terephthalic acid. Suitable diamines include tetramethylenediamine, hexamethylenediamine, octamethylenediamine, nonamethylenediamine, dodecamethylenediamine, 2-methylpentamethylenediamine, 2-methyloctamethylenediamine, trimethylhexamethylenediamine, bis(p-aminocyclohexyl)methane, m-xylylenediamine, and p-xylylenediamine. A suitable aminocarboxylic acid is 11-aminododecanoic acid. Suitable lactams include caprolactam and laurolactam.

Suitable polyamides include aliphatic polyamides such as polyamide 6; polyamide 6,6; polyamide 4,6; polyamide 6,9; polyamide 6,10; polyamide 6,12; polyamide 10,10; polyamide 11; polyamide 12; and copolymers and mixtures of these polymers.

Examples of suitable aliphatic polyamides include polyamide 6,6/6 copolymer; polyamide 6,6/6,8 copolymer; polyamide 6,6/6,10 copolymer; polyamide 6,6/6,12 copolymer; polyamide 6,6/10 copolymer; polyamide 6,6/12 copolymer; polyamide 6/6,8 copolymer; polyamide 6/6,10 copolymer; polyamide 6/6,12 copolymer; polyamide 6/10 copolymer; polyamide 6/12 copolymer; polyamide 6/6,6/6,10 terpolymer; polyamide 6/6,6/6,9 terpolymer; polyamide 6/6,6/11 terpolymer; polyamide 6/6,6/12 terpolymer; polyamide 6/6,10/1 1 terpolymer; polyamide 6/6,10/12 terpolymer; and polyamide 6/6,6/PACM (bis-p-[aminocyclohexyl]methane) terpolymer.

Suitable semiaromatic polyamides for use in preparing the compositions of the second and/or first components may include one or more homopolymers, copolymers, terpolymers, or higher polymers that are derived from monomers containing aromatic groups. They may also be a blend of one or more homopolymers, copolymers, terpolymers, or higher polymers that are derived from monomers containing aromatic groups with one or more aliphatic polyamides.

Preferred monomers containing aromatic groups are terephthalic acid and its derivatives, isophthalic acid and its derivatives, and m-xylylenediamine. It is preferred that about 5 to about 75 mole percent of the monomers used to make the aromatic polyarmide used in the present invention contain aromatic groups, and more preferred that about 10 to about 55 mole percent of the monomers contain aromatic groups. Thus, preferably, about 5 to about 75 mole percent, or more preferably, 10 to about 55 mole percent of the repeat units of all polyamides used in the present invention contain aromatic groups.

The semiaromatic polyamides may optionally contain repeat units derived from one or more additional aliphatic dicarboxylic acid monomers or their derivatives, such as adipic acid, sebacic acid, azelaic acid, dodecanedioic acid, and other aliphatic or alicyclic dicarboxylic acid monomers having 6 to 20 carbon atoms.

The semiaromatic polyamides may optionally contain repeat units derived from one or more aliphatic or alicyclic diamine monomers having 4 to 20 carbon atoms. Preferred aliphatic diamines may be linear or branched and include hexamethylenediamine; 2-methyl-1,5-pentanediamine; 1,8-diaminooctane; 1,9-diaminononane; methyl-1,8-diaminooctane; 1,10-diaminodecane; and 1,12-diaminododecane. Examples of alicyclic diamines include 1-amino-3-aminomethyl-3,5,5,-trimethylcyclohexane; 1,4-bis(aminomethyl)cyclohexane; and bis(p-aminocyclohexyl)methane.

The semiaromatic polyamides may optionally contain repeat units derived from lactams and aminocarboxylic acids (or acid derivatives), such as caprolactam, 11-aminoundecanoic acid, and laurolactam.

Examples of preferred semiaromatic polyamides include poly(m-xylylene adipamide) (polyamide MXD,6); hexamethylene adipamide/hexamethylene terephthalamide copyamide (polyamide 6,T/6,6); hexamethylene terephthalamide/2-methylpentamethylene terephthalamide copyamide (polyamide 6,T/D,T); poly(dodecamethylene terephthalamide) (polyamide 12,T); poly(decamethylene terephthalamide) (polyamide 10,T); decamethylene terephthalamide/decamethylene dodecanoamide copolyamide (10,T/10,12); poly(nonamethylene terephthalamide) (polyamide 9,T); the polyamide of hexamethylene isophthalamide and hexamethylene adipamide (polyamide 6,I/6,6); the polyamide of hexamethylene terephthalamide, hexamethylene isophthalamide, and hexamethylene adipamide (polyamide 6,T/6,I/6,6); and copolymers and mixtures of these polymers.

The semiaromatic polyamides will preferably have melting points that are at least about 280° C. and is preferably less than about 340° C. The semiaromatic polyamide preferably has a glass transition temperature of at least about 90° C., or more preferably of at least about 110° C., or yet more preferably of at least about 120° C.

The polyamide compositions of the first and second components may contain additional components such as flame retardants, flame retardant synergists, impact modifiers, stabilizers (such as oxidation, heat, ultraviolet light, etc. stabilizers), reinforcing agents and fillers (such as glass fibers, glass beads, mineral fibers, mica, talc, and the like), colorants, plasticizers, thermally conductive additives, electrically conductive additives, lubricants, nucleating agents, and the like.

The polyamide compositions may be made by melt-blending the component materials using a melt-mixer such as a single or twin-screw extruder, blender, kneader, or Banbury mixer.

The structures of the present invention may be used in a wide variety of applications. Examples of automotive applications include seat frame components, engine cover brackets, spare tire wells, front-end modules, steering column frames, instrument panels, door systems, body panels (such as horizontal body panels and door panels), engine covers, housings for transmission and power delivery components, oil pans, airbag housing canisters, automotive interior impact structures, engine support brackets, cross car beams, bumper beams, pressure vessels such as refrigerant bottles and fire extinguishers, automotive suspension wishbone and control arms, suspension stabilizer links, leaf springs, vehicle wheels, recreational vehicle and motorcycle swing arms.

Examples of other applications include appliance (such as washing machine) frames and sports equipment such as inline-skate components, baseball bats, hockey sticks, ski and snowboard bindings, and bicycle frames

EXAMPLES

"PPA" refers to a hexamethylene terephthalamide/2-methylpentamethylene terephthalamide semiaromatic polyamide.

"PA 6,6" refers to polyamide 6,6 and "PA 6" refers to polyamide 6.

Tensile properties were measured according to ISO 527 using a strain rate of 5 mm/min. Unnotched Charpy impact strengths were measured according to ISO 179. The faces of the bars were impacted.

Storage modulus was measured at 25° C. and 125° C. using a dynamic mechanical analyzer (TA Instruments Q800 DMA) under a three point flex constant load geometry. The temperature was increased at 2° C./min, frequency 1 Hz and amplitude of 10 micrometers. The percentage retention of storage modulus at 125° C. relative to that at 25° C. is reported in Table 2.

Examples 1 and 2 and Comparative Example 1

Laminates were prepared by compression molding a stack of nine layers of polymeric film alternating with nine layers of woven continuous glass fiber sheets into a 2 mm thick sheet. In the case of Example 1, the polymeric film was semiaromatic polyamide, and in the case of Example 2, it was polyamide 6,6.

The laminates were cut into 1.5 in×6 in rectangular bars and placed in the cavity of an injection molding machine. In each case, after it was preheated to 150° C., the laminate was overmolded with semiaromatic polyamide such that the resulting part had a thickness of about 0.125 in. In the case of Comparative Example 1, no laminate was used and semiaromatic polyamide was injection molded into parts having the same thickness as those prepared from the laminates.

The resulting molded parts were cut with a water jet into the required geometry for the determination of tensile properties and unnotched Charpy impact strengths and the corresponding test results are shown in Table 1. Impact testing was done wherein parts from Examples 1 and 2 were impacted on the laminate face or the overmolded face. The results from each are reported in Table 1. In the case of Comparative Example 1 there was no laminate face, so a single impact strength is reported under the heading of "overmolded face".

TABLE 1

|  | Example 1 | Example 2 | Comp. Ex. 1 |
| --- | --- | --- | --- |
| Laminate | PPA | PA 6,6 | — |
| Overmolded polymer | PPA | PPA | PPA |
| Tensile strength (MPa) | 156 | 160 | 112 |
| Elongation at break (%) | 2 | 1.2 | 1 |
| Tensile modulus (GPa) | 16 | 15.2 | 11.5 |
| Unnotched Charpy impact strength (kJ/m$^2$) |  |  |  |
| Laminate face | 92 | 172 | — |
| Overmolded face | 123 | 129 | 60 |

Examples 3-6 and Comparative Examples 2-6

Laminates were prepared from polymer films and woven continuous glass fiber sheets in a manner similar to that described above for use in Examples 3-6 and Comparative Examples 2 and 4. The polymeric films used are those indicated in Table 2 under the heading of "Laminate". The laminates were overmolded with the polymer indicated in Table 2 as described above, except that the inserted laminates were heated to 200° C. before overmolding. The thickness of the overmolded part is given in Table 2. The overmolded specimens were cut using a water jet into 13×60 mm bars that were used for storage modulus testing.

TABLE 2

|  | Ex. 3 | Comp. Ex. 2 | Comp. Ex. 3 | Ex. 4 | Comp. Ex. 4 | Comp. Ex. 5 | Ex. 5 | Ex. 6 | Comp. Ex. 6 |
|---|---|---|---|---|---|---|---|---|---|
| Laminate | PA 6,6 | PA 6,6 | — | PPA | PA 6 | — | PPA | PA 6,6 | — |
| Overmolded polymer | PPA | PA 6,6 | PA 6,6 | PA 6,6 | PA 6,6 | PA 6,6 | PPA | PPA | PA 6,6 |
| Part thickness (in.) | 0.1875 | 0.1875 | 0.1875 | 0.125 | 0.125 | 0.125 | 0.125 | 0.125 | 0.125 |
| Storage modulus at 25° C. (GPa) | 12 | 11.4 | 10.3 | 9.7 | 9.6 | 9.5 | 9.3 | 9.3 | 9.5 |
| Storage modulus at 125° C. (GPa) | 8.4 | 5.4 | 4.6 | 5.6 | 4.3 | 4.3 | 8.6 | 7.1 | 4.3 |
| Retention of modulus (%) | 70 | 47 | 45 | 58 | 45 | 45 | 93 | 77 | 45 |

Examples 7 and 8

10 mil films of PPA and an ionomer (Surlyn® 9320, supplied by E.I. du Pont de Nemours Inc., Wilmington, Del.) were prepared by melting solid polymer in a 28 mm twin screw and extruding it through a film die onto a casting drum. 10 mil laminates were prepared by compression molding alternating sheets of PPA film and sheets of woven continuous carbon fibers for 8 minutes under 8 Kpsi of pressure in a press in which the top and bottom plattens had been heated to 180° C. In the case of Example 8, ionomer film was laminated to one surface of the PPA/carbon fiber sheet laminate. The laminates of Example 7 (which had no ionomer tie layer) and Example 8 were placed in the mold cavity of an injection molding machine and overmolded with PPA. In the case of Example 8, the sample was positioned such that the surface comprising the ionomer film was overmolded. The mold cavity temperature was set at 100° C.; the barrel temperatures were set to 310° C.; and the melt temperature of the PPA was about 320-330° C. The laminates were not preheated.

In the case of Example 7, there was no adhesion between the laminate and the overmolding; they came apart to the touch. The adhesion between the laminate and the overmolded PPA resin was in the case of Example 8 was studied by peel testing in an Instron. The specimens exhibited a peak load of 15.6 lbf; a peak stress of 10.4 lbf/in; and a peel strength of 4.9 lbf/in.

What is claimed is:

1. A semiaromatic polyamide composite article comprising;
   (a) a first component having a surface and comprising a fiber-reinforced material comprising a polyamide composition and reinforcing fibers, wherein the first component is not prepared by injection molding and the fiber-reinforced material has a tensile modulus of at least about 16 GPa as measured by ISO method 527-2:1993 at a rate of 5 mm/min on test specimens having a thickness of 4 mm;
   (b) an optional tie layer having first and second opposite surfaces such that when the tie layer is present, the first surface of the tie layer is in contact with the surface of the first component; and
   (c) a second component comprising a polyamide composition,
   wherein the polyamide composition of the first component and/or the polyamide composition of the second component is a semiaromatic polyamide composition; and
   wherein the article is prepared by a process comprising injection molding and/or injection-compression molding the composition of the second component onto the surface of the first component when the optional tie layer is not present and injection molding and/or injection-compression molding the composition of the second component onto the second surface of the optional tie layer when the tie layer is present, and
   wherein the semiaromatic polyamide composite article has at least a 58% retention of storage modulus at 125° C. relative to the storage modulus at 25° C.

2. The article of claim 1, wherein the fiber-reinforced material is a laminate.

3. The article of claim 1, wherein the reinforcing fibers are selected from one or more of glass fibers, carbon fibers, and aramid fibers.

4. The article of claim 1, wherein the tie layer is present and comprises one or more polyamides, ionomers, and/or polyurethanes.

5. The article of claim 4, wherein the tie layer comprises one or more of polyamide 6; polyamide 6,6; polyamide 6,10; polyamide 6,12; polyamide 12; polyamide 11; and amorphous polyamides.

6. The article of claim 1, wherein the fiber-reinforced material has a tensile modulus of at least about 16 GPa as measured by ISO method 527-2:1993 at a rate of 5 mm/min on test specimens having a thickness of 4 mm.

7. The article of claim 1, wherein the polyamide composition of the first component comprises at least one semiaromatic polyamide.

8. The article of claim 1, wherein the polyamide composition of the second component is an aromatic polyamide composition comprising one or more of poly(m-xylylene adipamide) (polyamide MXD,6); hexamethylene adipamide/hexamethylene terephthalamide copolyamide (polyamide 6,T/6,6); hexamethylene terephthalamide/2-methylpentamethylene terephthalamide copolyamide (polyamide 6,T/D,T); poly(dodecamethylene terephthalamide) (polyamide 12,T); poly(decamethylene terephthalamide) (polyamide 10,T); decamethylene terephthalamide/decamethylene dodecanoamide copolyamide (10,T/10,12); poly(nonamethylene terephthalamide) (polyamide 9,T); the polyamide of hexamethylene isophthalamide and hexamethylene adipamide (polyamide 6,I/6,6); and/or the polyamide of hexamethylene terephthalamide, hexamethylene isophthalamide, and hexamethylene adipamide (polyamide 6,T/6,I/6,6).

9. The article of claim 1, wherein the polyamide composition of the first component comprises one or more of poly(m-xylylene adipamide) (polyamide MXD,6); hexamethylene adipamide/hexamethylene terephthalamide copolyamide (polyamide 6,T/6,6); hexamethylene terephthalamide/2-methylpentamethylene terephthalamide copolyamide (polyamide 6,T/D,T); poly(dodecamethylene terephthalamide) (polyamide 12,T); poly(decamethylene terephthalamide) (polyamide 10,T); decamethylene terephthalamide/decamethylene dodecanoamide copolyamide (10,T/10,12); poly (nonamethylene terephthalamide) (polyamide 9,T); the polyamide of hexamethylene isophthalamide and hexamethylene adipamide (polyamide 6,I/6,6); and/or the polyamide of hexamethylene terephthalamide, hexamethylene isophthalamide, and hexamethylene adipamide (polyamide 6,T/6,I/6, 6).

10. The article of claim 1 in the form of an automotive seat frame component, engine cover bracket, automotive spare tire well, front-end module, steering column frame, instrument panel, automotive body panel or appliance frame, engine covers, housings for transmission and power delivery components, oil pans, airbag housing canisters, automotive interior impact structures, engine support brackets, cross car beams, bumper beams, pressure vessels such as refrigerant bottles and fire extinguishers, automotive suspension wishbone and control arms, suspension stabilizer links, leaf springs, vehicle wheels, recreational vehicle and motorcycle swing arms, baseball bats, hockey sticks, ski and snowboard bindings, bicycle frames.

* * * * *